United States Patent [19]

De Kok

[11] 4,247,923
[45] Jan. 27, 1981

[54] METHOD AND APPARATUS FOR DETECTING THE LOCATION OF A MARINE PIPELINE OR CABLE

[75] Inventor: Robbert J. De Kok, Rijswijk, Netherlands

[73] Assignee: Shell Oil Company, Houston, Tex.

[21] Appl. No.: 42,398

[22] Filed: May 25, 1979

[30] Foreign Application Priority Data

Oct. 23, 1978 [GB] United Kingdom ............... 41648/78

[51] Int. Cl.³ ............................................. G01S 15/06
[52] U.S. Cl. ........................................ 367/88; 367/110
[58] Field of Search ................ 367/88, 106, 110, 113, 367/115

[56] References Cited
U.S. PATENT DOCUMENTS 3,744,013   7/1973   Lapetina ......................... 367/88 X
4,025,895   5/1977   Shatto ............................ 367/106

FOREIGN PATENT DOCUMENTS 2639476   3/1977   Fed. Rep. of Germany .

Primary Examiner—Richard A. Farley

[57] ABSTRACT

Method and apparatus for detecting the location of a marine pipeline or cable, whereby acoustic pulses are transmitted by a submarine pulse transmitter carried by a vessel. These pulses, as well as the reflections of the pulses on the seabottom and on the pipeline or cable are detected by means of two detectors that are carried by two paravanes towed by the vessel. The signals received by the detectors are combined and the record of the combined signals is displayed. The signal parts that are representative of the acoustic waves reflected by the pipeline are identified in the record by separate colors or various intensities of a single color.

16 Claims, 8 Drawing Figures

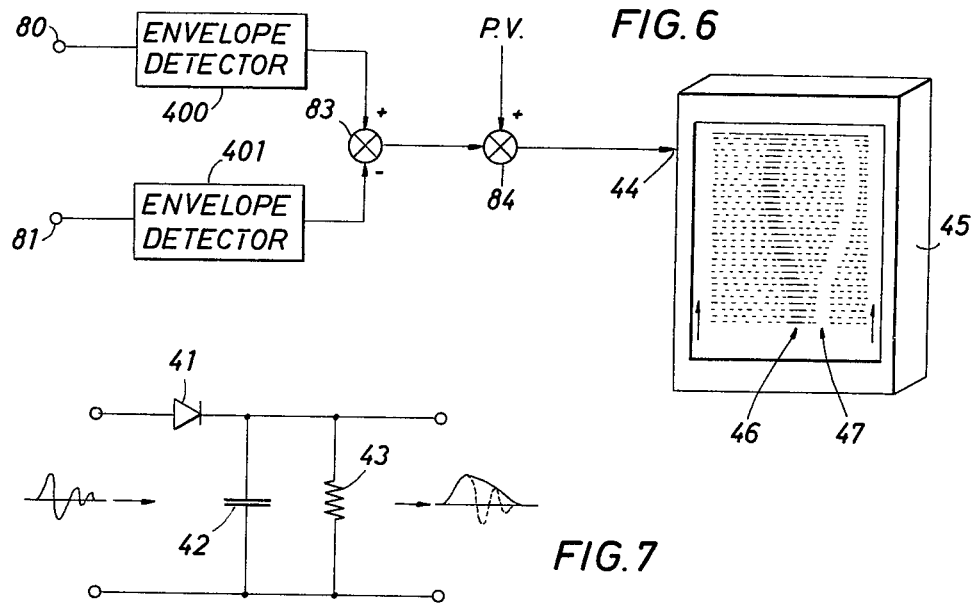
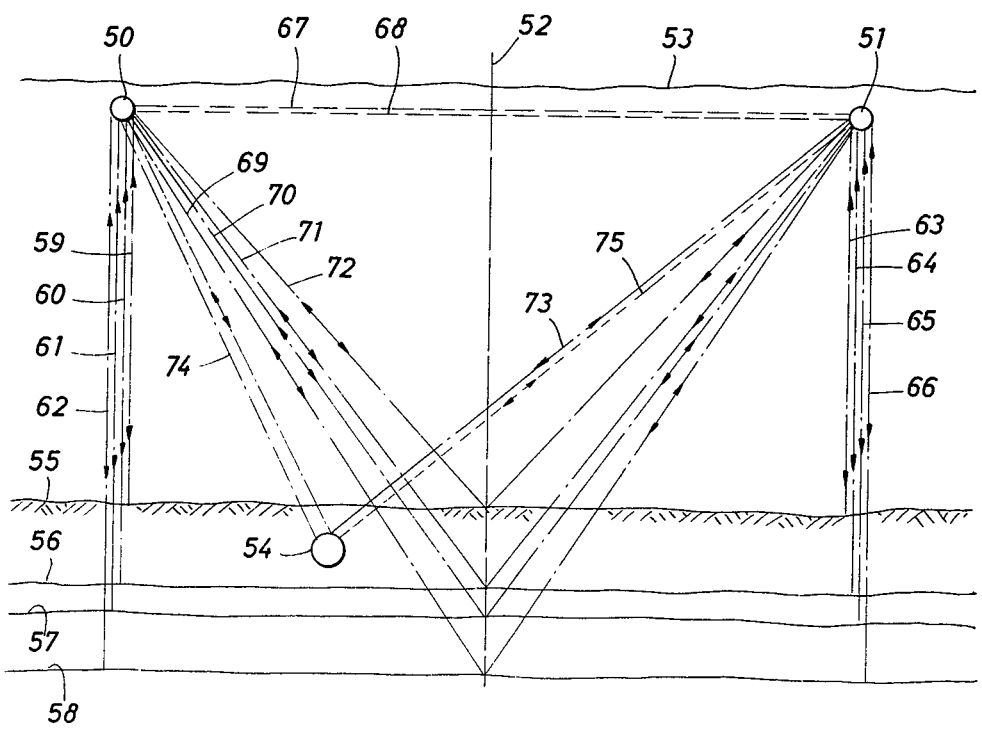

METHOD AND APPARATUS FOR DETECTING THE LOCATION OF A MARINE PIPELINE OR CABLE

BACKGROUND OF THE INVENTION

The invention relates to a method and apparatus for detecting the location of a marine pipeline or a cable.

Numerous pipelines (and cables) have already been placed during the last decades on and in the bottoms of seas and oceans, which pipelines have to be inspected from time to time, such as for checking the depth at which they are located below the sea or ocean bottom. Such inspection is carried out by vessels, such as surface vessels and submarines carrying equipment for detecting the presence of the pipeline (or cable) on or in the marine bottom for mapping the actual position thereof and at the same time taking other measurements in relation to the pipeline. Pipeline detection is usually carried out by generating a sequence of acoustic wave pulses by submarine wave transmitting means. Acoustic waves reflected by the pipeline are detected by submarine wave receiving means and displayed to show the position of the pipeline or cable with respect to the water-bottom.

In the prior art techniques, the wave reflections of the water bottom and the bottom layers, however, often obscure the wave reflections of the pipeline in the display of the records of the signals received by the receiving means, thereby rendering an accurate interpretation of the display impossible. The prior art techniques further have no means for indicating at which side of the vessel the pipeline is situated, and to obtain reliable information thereon, the vessel must be steered at a course that crosses the pipeline at a substantially right angle thereto. It will be appreciated that such crossings that have to be repeated many hundreds of times along the length of the pipeline, are a time consuming operation that renders the prior art techniques economically unattractive.

SUMMARY OF THE INVENTION

An object of the invention is a method for detecting a submarine pipeline or a cable wherein the position of the vessel with respect to the pipeline or cable can be ascertained and at the same time the undesired acoustic pulse reflections originating from the marine bottom layers, as well as the wave pulses directly received by the receiving means are suppressed to such an extent that the errors in reading the display are minimized.

Another object of the invention is an apparatus for carrying out this method.

According to the invention, a method is provided for detecting the location of a marine pipeline or a cable by means of a sequence of acoustic wave pulses received by a first and a second submarine wave receiving means situated at substantially equal depth below the water level and generated by submarine wave transmitting means symmetrically arranged with respect to the plane of symmetry of the first and the second wave receiving means. The wave pulses pass from the transmitting means to the first and the second receiving means directly as well as indirectly by being reflected by submarine bottom layers and by the pipeline or the cable. The method comprises obtaining after each transmittal of an acoustic pulse a first and a second signal as a function of time of the amplitudes of the acoustic waves received by the first and the second receiving means, respectively, the first and the second signal forming a pair of signals, each signal of the pair of signals including a first part representing the wave pulse reflection(s) by the pipeline, and both signals of a pair further including second parts substantially identical to each other and representing direct wave pulses and wave pulse reflections other than those originating from the pipeline. The signals of each pair are combined and a separate record of the combined signals is displayed. The first parts in the record of the combined signals are then distinguished from each other as well as from the substantially identical second parts by separate colors or by various intensities of a single color when the pipeline or cable is outside the plane of symmetry. The separate records are displayed in the same sequence as the sequence of the transmitted acoustic pulses from which they originate.

According to the invention, the apparatus for detecting the location of a marine pipeline or cable includes a first and a second receiver for detecting submarine acoustic waves and each being adapted to be supported by a vessel at equal depth below the water level, acoustic wave pulse transmitting means adapted to be supported by the vessel below the water level at a location symmetrically arranged with respect to the first and the second receiver, means for obtaining a first and a second signal as a function of time and representative of the waves received by the first and the second wave receiver, respectively, which signals originate from a common wave pulse transmitted by the transmitting means, means for combining the signals of each pair of signals, means for displaying a separate record of the combined signals and distinguishing in said separate record the substantially identical parts from the substantially non-identical parts of the first and second signals by separate colors or by various intensities of a single color, and means for displaying the separate records in the same sequence as the sequence of the transmitted acoustic pulses from which they originated.

BRIEF DESCRIPTION OF THE DRAWINGS

The invention will be described hereinafter in more detail with reference to the drawings wherein some embodiments of the invention are shown by way of example.

FIG. 6 shows schematically equipment according to the invention wherein use is made of various intensities of a single color for identifying the position of a vessel with respect to a submarine pipeline.

FIG. 7 shows schematically an electric circuit of an envelope detector for use in the equipment of FIG. 6.

FIG. 8 shows a vertical section over a marine bottom and two transmitting/receiving elements that operate according to a principle that is an alternative of the operation principle of the system shown in FIG. 2.

DESCRIPTION OF A PREFERRED EMBODIMENT

Figure 1:
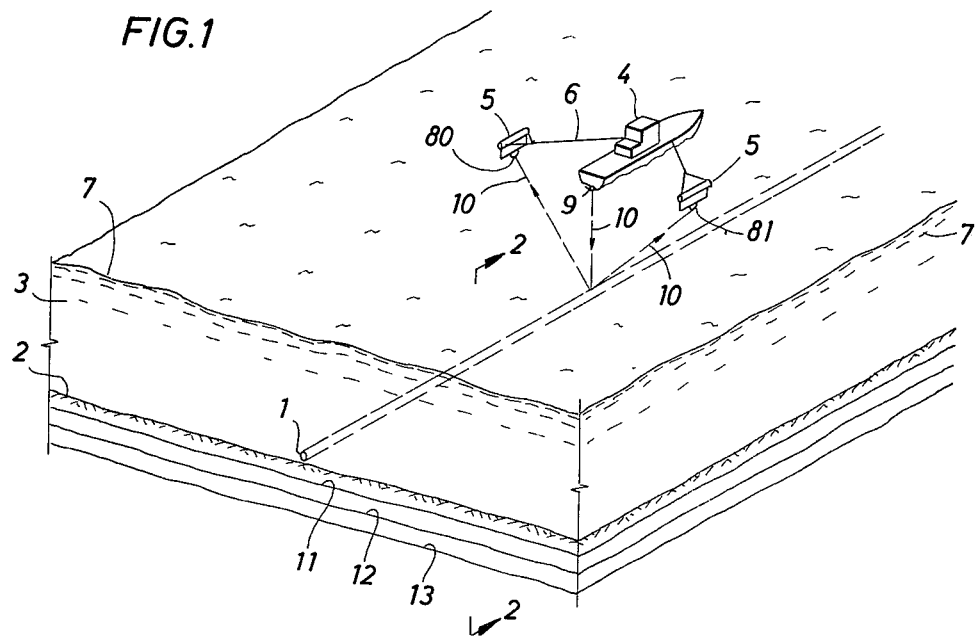
FIG. 1 shows schematically in perspective view a surface vessel passing as closely as possible over and along a pipeline situated on the bottom of a body of water.

The pipeline 1 shown in FIG. 1 is situated on the seabottom 2 below a body of water 3 on which the surface vessel 4 is floating. The vessel 4 tows two paravanes 5 by means of cables 6. The paravanes are towed by means that are well known in such a way that they are substantially symmetrically arranged with respect to the longitudinal plane of symmetry of the vessel 4. The paravanes 5 support receivers 80 and 81 for receiving acoustic waves, such waves originating from the acoustic pulse transmitter 9 that is supported by the vessel 4 below the water level 7 and is situated in the longitudinal plane of symmetry of the vessel 4. The paths of the waves that are received by the receivers 80 and 81 after being reflected by the pipeline 1 are indicated by the dashed lines 10.

However, there are also waves that reach the wave receiving means 80 and 81 along other paths. These latter waves travel from the transmitting means 9 through the body of water to the receivers 80 and 81 either directly or indirectly after having been reflected by the seabottom 2 and/or the subsurface layers 11, 12, 13 etc. that have the ability to reflect acoustic waves. This will be explained in more detail with reference to FIG. 2.

Figure 2:
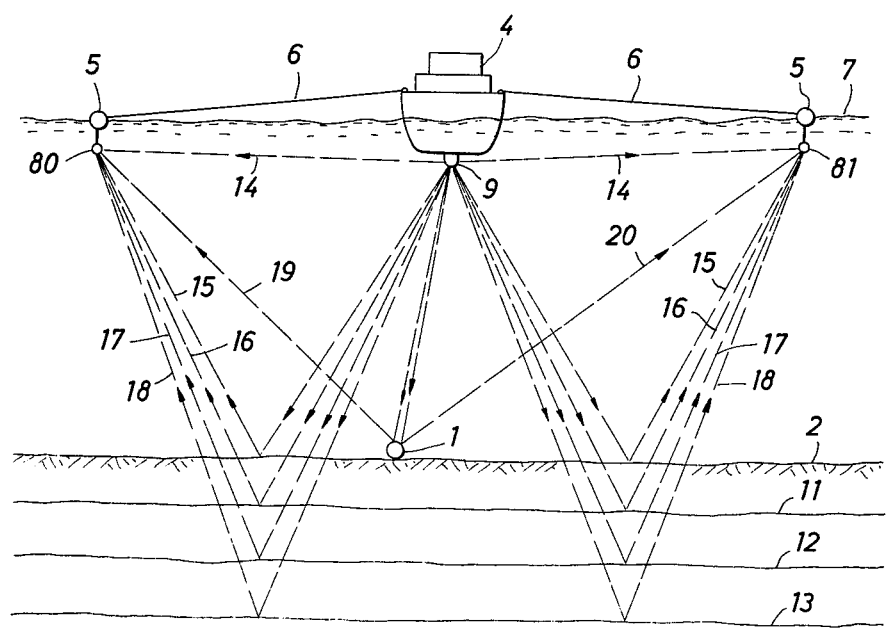
FIG. 2 shows schematically on a larger scale the vertical section 2—2 of FIG. 1.

The acoustic pulses suitable for use in the method according to the invention are high power sound wave pulses of a suitable signal frequency transmitted by the wave transmitting means 9 (see FIG. 2). Wave transmitting means as well as wave receivers for submarine use are well known (such as PINER-Model 1036, BOOMER-Models 230/240 and MONOPULSE-Model 515, manufactured by ORE, EG & G. and Edo-Western, respectively) and do not require a detailed description thereof. The wave pulses generated by such wave transmitting means travel in spherical expanding wavefronts that either hit the wave receivers 80 and 81 (carried by the paravanes 5) directly as indicated by the paths 15, 16, 17 and 18 after being reflected by the sea bottom 2, and the reflecting layers 11, 12 and 13 present in the seabottom.

It will be appreciated that both paths 14 are of substantially equal length since the wave transmitting means 9 is located in the plane of symmetry of the wave receivers 80 and 81. The same applies since the reflecting surfaces 2, 11, 12 and 13 are substantially horizontal, for both paths 15, both paths 16, both paths 17, as well as both paths 18. Such is further also the case for any other pair of paths followed by waves that have been reflected by any other reflecting layers that are present below the sea bottom 2, and that have not been shown in the drawing.

Figure 3:
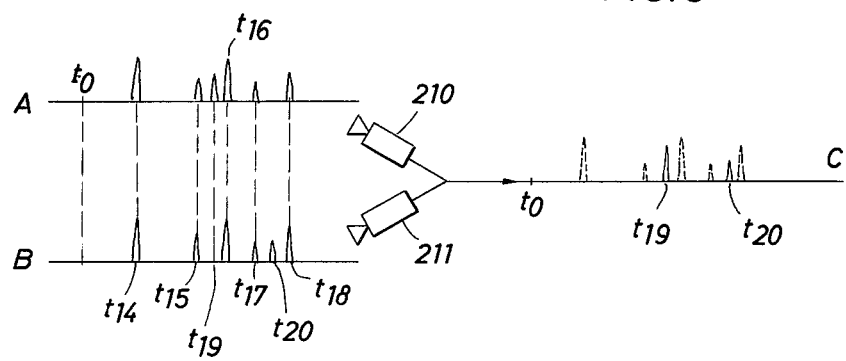
FIG. 3 shows schematically the records A and B of acoustic waves records received by the wave receiving means of the means according to the invention, as well as record C that is formed by combining the records A and B.

The receipt of the waves following the paths 14-18, by the receivers 80 and 81 is indicated in the records A and B that are schematically shown in FIG. 3. The record A originates from the waves detected by the receiver 80 supported by the port paravane 5, whereas the record B originates from the waves detected by the receiver 81 supported by the starboard paravane 5.

Time $t_o$ indicates the moment at which an acoustic wave pulse is transmitted by the transmitting means 9, and it will be appreciated that the arrival of the direct waves travelling along the paths 14 will be at exactly the same moment by the port and the starboard receiver 80 and 81, respectively, at the time $t_{14}$ indicated on the time axis of the record B. The same applies for the waves that have been reflected by the sea bottom 2 and by the reflecting layers 11, 12 and 13 and have followed the paths 15-18, respectively. The relevant arrival times shown on the time axis of the record B are $t_{15}$, $t_{16}$, $t_{17}$ and $t_{18}$, respectively.

As shown in FIG. 2, the pipeline 1 is located at port of the vessel 4. Consequently, the path 19 travelled by the wave that is reflected by the pipeline 1 and finally received by the port receiver 80 is shorter than the path 20 that is followed by the wave that is reflected by the pipeline 1 and finally detected by the starboard receiver 81. Thus, the pipeline reflection signal recorded in record A at time $t_{19}$ has arrived earlier than the pipeline reflection signal recorded in record B at time $t_{20}$. The difference between these two arrival times indicates that the pipeline is located at port of the vessel. However, the signals at these arrival times are hardly recognizable between the signals that have arrived at times $t_{15}$–$t_{18}$ and that result from the reflections of the acoustic pulse by the sea bottom and the subsurface reflecting layers. The signals reflected by the pipeline are now made distinguishable from the signals formed by the bottom and layer reflections by viewing the record A by an electronic camera 210 that has an output thereof electrically connected to the input of the red color gun of a color cathode ray tube (not shown) as a result whereof record A will be displayed on the screen thereof in red color. The record B is viewed by an electronic camera 211 that has the output thereof electrically connected to the input of the green color gun of the color cathode ray tube, as a result whereof record B will be displayed on the screen in green color.

By displaying the pair of records A (in red color) and B (in green color) simultaneously such that the time axes thereof coincide (with coinciding times $t_o$), a three-color record C is formed, wherein the parts that correspond with the substantially identical parts of the records A and B—that is, the parts of the records A and B having substantially equal signal strength and pattern and representing direct wave pulses and wave pulse reflections other than those originating from the pipeline—will be presented in yellow color to the helmsman of the vessel 4, who is watching the screen. It will be appreciated that a yellow color impression (obtained by mixing the colors red and green) will also be given to the helmsman, if the signals of these substantially identical parts are not exactly equal in strength, and/or there are small differences in arrival time, which may be due to a small tilt of the relevant reflecting layer, and/or a small difference in the submergence of the paravanes 5. The yellow parts of the record C are indicated in dashed lines in FIG. 3.

The waves reflected by the pipeline 1 and resulting from a single pulse of the transmitting means 9 have, however, arrived at different times at the wave receivers 80 and 81 since the paths 19 and 20 differ in length. The arrival times $t_{19}$ and $t_{20}$ of the signals representing these waves are indicated on the time-axis of the record B and these signals can be identified in the record C by their colors. The signal part of record A that has arrived at time $t_{19}$ will be colored red in the record C, since the camera 210 is electrically connected to the red color gun of the cathode ray tube. Likewise, the signal part of record B that has arrived at time $t_{20}$ will be colored green in the record C, since the camera 211 viewing the record B of which the wave reflection that has arrived at time $t_{20}$ forms part, is electrically connected to the green color gun of the cathode ray tube.

A way of presenting the information on the lengths of the paths 19 and 20 to the helmsman of the vessel 4 in an easily recognizable form from which direct conclusions regarding the position of the vessel vis a vis the pipeline can be drawn, will now be described with reference to FIG. 4 of the drawings.

Figure 4:
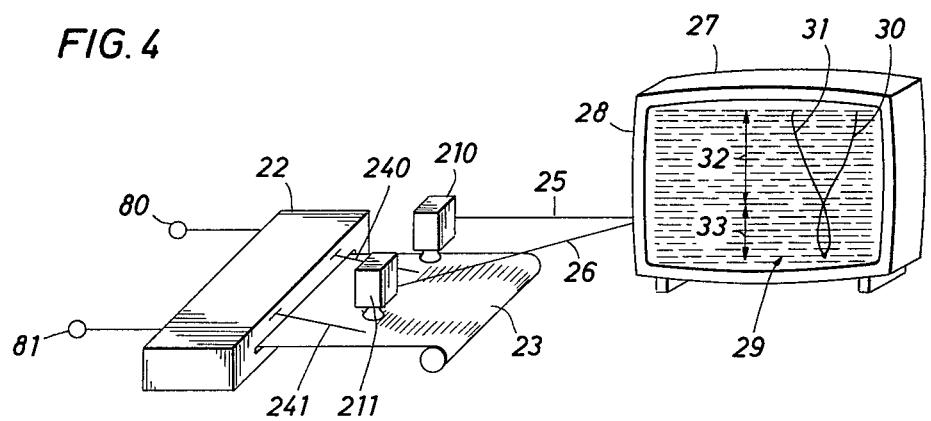
FIG. 4 shows schematically equipment according to the invention wherein use is made of three different colors for identifying the position of a vessel with respect to a submarine pipeline.

FIG. 4 schematically indicates the handling of the signals to obtain the desired display on the screen of a color cathode ray tube. The wave receivers 80 and 81 transduce the acoustic energy of the waves hitting these means into electric energy that is transmitted (after suitable amplification) to the recorder 23 from which a paper sheet 24 is produced on which sheet first and second records are drawn by the movable pens 240 and 241, which records are displayed in side-by-side relationship in the sequence in which the signals have been received in a single color (such as black or any other suitable color) on the white sheet 23 and are viewed by the electronic cameras 210 and 211, respectively, that have the outputs thereof connected via the electric conduits 25 and 26 to the red color gun (not shown) and the green color gun (not shown), respectively, of the color cathode ray tube 27.

The set of records traced by the pen 240 is now displayed on the screen 28 of the cathode ray tube 27 simultaneously with the set of records traced by the pen 241. The last received pair of records is displayed at the bottom of the screen (see record 29). It will be appreciated that each pair of records that originates from a common wave pulse, will be displayed on the screen 28 as a single three-color record. The three colors are red, green and yellow, this last color being obtained by mixing red and green. Since the major parts of the records of each pair of records are substantially identical, the dominating color of the records displayed on the screen will be yellow. If the vessel is not directly above the pipeline that is being surveyed (or in other words if the pipeline is not located in the plane of symmetry of the receivers 80 and 81) each combined record representing a pair of records will show a red and a green part. These red and green parts of the sequences of combined records displayed on the screen 28 will line up, thereby forming a green line 30 and a red line 31. It will be appreciated that over period 32, the pipeline 1 was at port of vessel 4, and the helmsman was steering to port until at the moment between the periods 32 and 33 the vessel 4 was exactly above the pipeline 1. Thereafter (over the period 33) the pipeline was at starboard of the vessel and the vessel was being steered to have the lines 30 and 31 as closely together as possible, in order that the vessel would follow the pipeline without undesired deviations from the track thereof. Any desired measurements may be carried out over the period that the vessel follows the pipeline track, such as for measuring the depth at which the pipeline is buried below the sea bottom by receiving the reflections of the wave pulses by a receiving means that is mounted close to the wave pulse transmitting means 9, or forms part of said latter means. A piezoelectric element can be used for this purpose, which is controlled in a known manner by an electric circuit that periodically supplies electric energy to the element for transmitting purposes, and periodically switches the element to another circuit adapted for measuring any loads exerted on the element by acoustic waves hitting the element.

Figure 5:
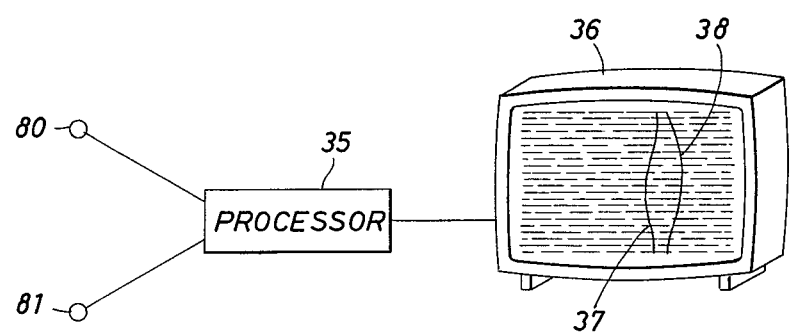
FIG. 5 shows schematically other equipment according to the invention wherein use is made of three different colors for identifying the position of a vessel with respect to a submarine pipeline.

In an alternative manner, the data originating from the receivers 80 and 81 are (after suitable amplification) supplied to a processor 35 (see FIG. 5) which has the output thereof coupled to the input of a monitor 36. The data are temporarily stored in a digitized form in the processor 35 in the sequence of receipt (or in a minicomputer suitable for the purpose) and are periodically transmitted—after being amplified to a suitable degree—to the monitor 36 where signals from the first and second receivers 80 and 81 are supplied to a first and a second color gun of a color cathode ray tube, respectively, in such a way that the data of the most recent pair of signals A and B are combined to display a three-color record on the lowermost line of the monitor 36, whereas each preceding pair of signals A and B is combined to form a three-color record that is displayed on a higher line of the monitor, in the sequence in which the relevant pairs of signals have been received by the receivers 80 and 81. Each subsequent receipt of a new pair of signals A, B is displayed on the lowermost line of the monitor in the form of a three-color record, and the preceding records are all shifted one line to the top of the monitor, thereby deleting the oldest trace that was displayed on the uppermost line of the monitor 36. As has been explained already with reference to FIG. 4, the dominant color of the records displayed on the monitor will be yellow if the red and green color guns of the monitor are commanded to display the data originating from the receivers 80 and 81, respectively. The red and green parts shown by each three-color record will (provided that the vessel is not right above the pipeline) line up in the display on the monitor to red and green lines 37 and 38, respectively. The way in which use can be made of this display for steering the vessel has already been explained hereinabove with reference to FIG. 4. The electronic circuit of the processor 35 (as well as a program for the computer that may be used instead of the processor) does not form part of the invention and is not described herein. Any expert, however, can design such circuit or program. Reference is now made to FIG. 6 of the drawings, which figure shows schematically a way of displaying combined pairs of signals originating from the receivers 80 and 81, wherein instead of a three-colored display of the combined data, a single color display is used with various intensities. A gray shade recorder is used for this purpose which recorder produces traces having various shades from white to black in dependence on the voltage applied to the input thereof. Such gray shade-(graphic-, facsimile-) recorders are known in the art (such as the Fiber Optics Recorder-Model 552 B and the Dry Paper Graphic Recorder-Models 3200/4600 manufactured by Edo Western and EPC, respectively) and will therefore not be described here in detail.

The signals received by the receivers 80 and 81 are separately passed through envelope detectors 400 and 401, respectively. The basic scheme of such envelope detector is shown in FIG. 7. The circuit of such a detector consists of a diode 41, a capacitor 42 and a resistor 43 that are electrically interconnected in the manner shown.

After having passed through the envelope detectors, the signals are added by adder 83, which has the effect that signals originating from the first and second receiving means, respectively, are represented by electric signals of opposite voltage. Thereafter, a positive direct voltage P.V. of a predetermined constant value is added by adder 84. This voltage represents the background gray level. The signals are then supplied to the input 44 of the gray-shade recorder 45. It will be appreciated that the voltages representing the substantially identical parts of the signals forming a pair and originating from the receivers 80 and 81 will substantially cancel each other in the signal supplied to the recorder, as a result whereof these parts will obtain the background gray level in the display of the recorder 45.

The wave pulse reflected by the pipeline and detected by receiver 80 will, however, not be cancelled if the vessel is not right above the pipeline, and the signal supplied to the recorder 45 will then have a voltage of a level that is higher than the level of the voltage P.V. representing the background gray level. Consequently, that part of the recorded signal will have a darker shade of gray, which may even turn to black in case of a very strong reflection of the wave pulse by the pipeline. Further, the signal representing the wave-pulse reflection received by receiver 81 will lower the voltage P.V. supplied to the input of the recorder, as a result whereof that part of the recorded signal will have a lighter shade of gray, which may even turn to white in case of a very strong reflection of the wave pulse of the pipeline. The darker shades of gray and the lighter shades of gray in sequence of records recorded by the gray-shade recorder 45 will line up, thereby forming lines 46 and 47 which correspond with the lines 30 and 31 shown in FIG. 4. The way in which such lines are to be interpreted has already been described hereinabove with reference to FIG. 4.

Finally, reference is made to FIG. 8 of the drawings, which figure shows an embodiment of the invention comprising an alternative arrangement of transmitting and receiving means. These means consist of combined acoustic wave transmitting and receiving elements, such as the piezoelectric element referred to hereinabove. Two of these elements 50, 51 are symmetrically arranged with respect to the longitudinal plane of symmetry 52 of a vessel (not shown). FIG. 8 shows a cross-section of the body of water on which the vessel is floating, this section being taken rectangular to said plane of symmetry. The elements 50, 51 are located at equal depths below the water level 53 and are supported by the vessel (not shown) either directly by the hull thereof, or indirectly by paravanes that are towed thereby. Activation of the elements 50, 51 to transmit a wave pulse takes place simultaneously and periodically. After each wave pulse transmission, each of the elements 50, 51 is connected to a circuit adapted for measuring the receipt of acoustic waves that hit the said elements.

The pipeline 54 that is buried below the sea bottom 55 is shown in cross-section in FIG. 8.

In the sea bottom, there are layers 56, 57 and 58 that will reflect part of any acoustic wave pulses that pass through the sea bottom.

Lines 59–62 indicate the paths travelled in two directions by acoustic waves originating from the piezoelectric element 50 and reflected by the sea bottom 55 and the layers 56–58, respectively.

It will be appreciated that the reflected energy of these waves will be received by the element 50 at substantially the same strength and at substantially the same time as the reflected energy of the waves that have travelled along the paths indicated by the lines 63–66, which waves have been generated and received by the element 51, and been reflected by the sea bottom 55 and the reflecting layers 56–58. Therefore, when combining the records after having identified them by a first and a second color, respectively, those parts of the combined records formed of the signals received by the elements 50, 51 that result from waves that have travelled along vertical paths and have been reflected by the sea bottom 55 and the layers 56–58 will be represented by a third color that is obtained by mixing of the first and the second color.

Such representation by the third color also takes place for the waves that have travelled directly from the element 50 to the element 51 along the path indicated by the line 67, and from the element 51 to the element 50 along the path indicated by the line 68, as well as for the waves travelling in both directions along the paths indicated by the lines 69–72, which waves are reflected in the plane of symmetry 52 by the sea bottom 55 and the layers 56, 57 and 58.

Further, the waves emitted by the piezoelectric element 50 and received by the piezoelectric element 51 after having been reflected by the pipeline 54 will have the same distance of travel (see the path indicated by the line 73) as the waves reflected by the pipeline but travelling from the element 51 to the element 50. It will be appreciated that the signals appearing in a combined record and resulting in a combined record and resulting from these reflected waves will also be represented by the third color.

Those wave portions that originate from the element 50 and after reflection by the pipeline 54 are returned to this element for receipt thereby will, however, be represented by the first color. The path followed by these wave portions is indicated by the line 74. Further, a path indicated by the line 75 will be followed by wave portions originating from the element 51 and returned to this element after being reflected by the pipeline 54. As long as the central axis of the pipeline 54 is outside the plane of symmetry 52, the paths indicated by the lines 74 and 75 will be of different length, and those parts of the signals generated by the waves following these latter paths, which signal parts appear in the records made of the wave receipts by the elements 50 and 51 will not be presented by the third color when the records are combined. Such combining of the records may take place in the same manner as described with reference to FIGS. 4, 5 and 6, wherein, however, the elements 80 and 81 have been replaced by the elements 50 and 51 of FIG. 8.

Application of the method of the present invention using the three-color principle is not limited to the use of a color cathode ray tube for displaying the position of the vessel with respect to the pipeline. In an alternative form, the records A and B (of FIG. 3) may be displayed in a two-color print, which forms the trace C wherein three colors can be distinguished, to wit the original two colors, and a third color resulting from mixing the other two colors. This third color indicates the substantially identical parts of the basic records, which parts do not contain any useful data on the position of the vessel with respect to the pipeline.

It will be appreciated that the lengths of the paths indicated by the lines 74 and 75 will be equal, if the axis of the pipeline 54 is in the plane of symmetry 52 of the elements 50, 51. Then, all parts of the records originating from the two elements 50, 51 will be equal and the display of the combined records will be in the third color only. However, this generally does not form a problem since the course of the vessel will frequently vary slightly from the track of the pipeline, as a result whereof the length of the paths 74 and 75 will differ again. If, however, signals indicating the position of the pipeline are required if the vessel is exactly above the pipeline, the vessel should be positioned such that the longitudinal plane of symmetry thereof does not coincide with the plane of symmetry 52 of the elements 50, 51.

Of course, the embodiment illustrated in FIG. 8 will function in the same manner of, instead of single piezoelectric elements 50 and 51, there are two piezoelectric elements each for 50 and 51; one would function as a receiver and one as a transmitter. Each transmitter would be located adjacent the receiver which is associated with the opposite transmitter.

Further, the invention is not limited to the application of a surface vessel for supporting the wave transmitting and receiving means. Submarines may be used for this purpose as well. Also, the invention is not limited to the use of paravanes. If desired, the wave transmitting means and/or the wave receiving means may be carried directly by the vessel, such as by being mounted on the hull thereof, or on booms or other supporting means that are connected to the hull.

Apart from the colors red and green that have been used in some of the examples of the embodiments of the invention as described herein, other pairs of colors may be used as well, provided that these colors, as well as the color obtained by mixing these colors are easily identifiable by the human eye.

Further, more than one set of pipe tracing equipment according to the invention may be used on a single vessel. This is particularly attractive when the vessel is of great length, and should be positioned above the vessel over the total length thereof, as may be required when carrying out pipeline repairs from such vessel.

What is claimed is:

1. Method for detecting the location of a marine pipeline or a cable by means of a sequence of acoustic wave pulses received by a first and a second submarine wave receiving means situated at substantially equal depth below the water level and generated by submarine wave transmitting means symmetrically arranged with respect to the plane of symmetry of said first and said second wave receiving means, wherein said wave pulses pass from said transmitting means to said first and said second receiving means directly as well as indirectly, by being reflected by submarine bottom layers and by said pipeline or said cable, said method comprising the steps of:

obtaining after each transmittal of an acoustic pulse a first and a second signal as a function of time of the amplitudes of said acoustic waves received by said first and said second receiving means, respectively, said first and said second signal forming a pair of signals, each signal of said pair of signals including a first part representing the wave pulse reflections by said pipeline, and both signals of a pair further including second parts substantially identical to each other and representing direct wave pulses and wave pulse reflections other than those originating from said pipeline;

combining the signals of each pair and displaying a separate record of said combined signals;

distinguishing in said separate record of said combined signals said first parts from each other as well as from said substantially identical second parts when said pipeline or cable is outside the plane of symmetry; and, displaying said separate records in the same sequence as the sequence of the transmitted acoustic pulses from which they originate.

2. Method according to claim 1 wherein said first and said second signal of each pair of signals is in the form of a first and a second record, which records are identified by a first and a second color, respectively, which colors, when combined, yield a third color which third color indicates in said separate record said substantially identical parts of the signals;

whereas said first parts of said signals are represented in said separate record by said first and second colors when said pipeline or cable is outside the plane of symmetry.

3. Method according to claim 2, wherein said first and second records of said first and second signals originating from said first and said second receiving means, respectively, are displayed on a sheet in side-by-side relationship in the sequence in which the signals have been received forming a first and second display;

each display is monitored by an electronic camera; and, the output signals of said cameras are supplied to separate color guns of a color cathode ray tube such that the records of each pair of signals coincide on the screen of the cathode ray tube.

4. Method according to claim 2, wherein said first and second records of said pairs of signals are stored in digitized form in the sequence of receipt thereof; and, said sequences of records originating from said first and said second receiving means are periodically and simultaneously supplied to a first and a second color gun of a color cathode ray tube, respectively, such that said records of each pair of signals coincide on the screen of the cathode ray tube.

5. Method according to claim 1, wherein the signals originating from said two receiving means are electric signals of opposite voltages which signals are added together and to a direct voltage of a predetermined constant value; and, the resulting voltage is supplied to the input of a recorder suitable for recording gray shades ranging from white to black in dependence of the level of the voltage supplied to the input thereof.

6. Apparatus for detecting the location of a marine pipeline or a cable, said apparatus including:

a first and a second receiver for detecting submarine acoustic waves, each being adapted to be supported by a vessel at equal depth below the water level;

acoustic wave pulse transmitting means adapted to be supported by said vessel below the water level at a location symmetrically arranged with respect to said first and said second receiver;

means for obtaining a first and second signal as a function of time and representative of the acoustic waves received by said first and said second wave receiver, respectively, which signals originate from wave pulses transmitted by said transmitting means whereby said first and second signals have parts substantially identical and parts substantially non-identical;

means for combining the said first and said second signals;

means for displaying a separate record of said combined signals and distinguishing in said separate record the substantially identical parts from the substantially non-identical parts of said first and second signals; and, means for displaying said separate records in the same sequence as the sequence of the transmitted acoustic pulses from which they originated.

7. Apparatus according to claim 6, including means for generating records of said first and said second signal having a first and a second color, respectively, which colors when combined yield a third color.

8. Apparatus according to claim 6, including:

means for printing on a sheet a first set and a second set of records of the signals originating from the first and the second receiver, respectively, such that the signals of each set are in side-by-side relationship;

a first and a second electronic camera arranged to monitor the first and the second set of records, respectively; and, a color cathode ray tube having two color guns, each gun being electrically connected with the input thereof to the output of one of the cameras.

9. Apparatus according to claim 6, including a data processor for separately storing the signals originating from said first and said second receiver, and for periodically and simultaneously supplying the separately stored signals to separate color guns of a color cathode ray tube.

10. Apparatus according to claim 6, including:

means to transform the signals originating from said two receivers into electric signals of opposite voltage;

adding means for adding said electric signals together and to a direct voltage of a predetermined constant value; and, a recorder suitable for recording gray shades ranging from white to black in dependence on the level of a voltage supplied thereto, the input of said recorder being electrically connected to the output of said adding means.

11. Apparatus according to claim 6, including a vessel supporting said first and said second receiver and said acoustic wave pulse transmitting means below the water level.

12. Apparatus according to claim 11, wherein said first and said second receiver are towed by said vessel at opposite sides thereof.

13. Apparatus according to claim 6, wherein said transmitting means comprises a single transmitter.

14. Apparatus according to claim 6, wherein said transmitting means comprises two transmitters, each transmitter being located close to one of said receivers.

15. Apparatus according to claim 13 or 14, wherein said transmitting means and said receivers comprise piezoelectric elements.

16. Apparatus according to claim 6, wherein said first and said second receivers are transmitting means.

* * * * *